UNITED STATES PATENT OFFICE.

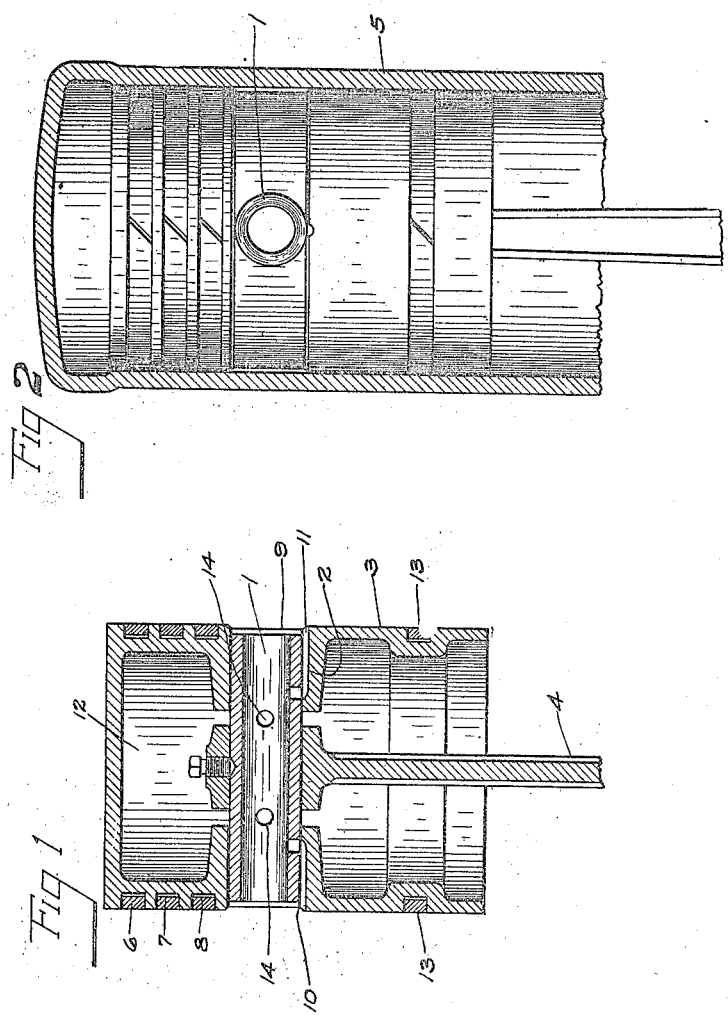

CHARLES BALOUGH, OF SPRINGFIELD, OHIO, ASSIGNOR TO THE KELLY-SPRINGFIELD MOTOR TRUCK COMPANY, OF SPRINGFIELD, OHIO, A CORPORATION OF OHIO.

OILING DEVICE.

1,137,111.

Specification of Letters Patent.   Patented Apr. 27, 1915.

Application filed November 7, 1913.   Serial No. 799,795.

*To all whom it may concern:*

Be it known that I, CHARLES BALOUGH, a citizen of Austria-Hungary, residing at Springfield, in the county of Clark and State of Ohio, have invented certain new and useful Improvements in Oiling Devices, of which the following is a specification.

This invention relates to devices for oiling the wrist-pin connection between the piston and connecting rod of an internal explosive engine.

The object of the invention is to provide the bearings of the wrist-pin with ample lubrication and to also provide for excluding from said bearings carbon and soot carried by the gases escaping from the combustion chamber.

In the accompanying drawings, Figure 1 is a sectional view of a piston, wrist-pin and connecting rod embodying my improvements. Fig. 2 is a section of a cylinder showing the piston in position therein.

Like parts are represented by similar characters of reference in the several views.

In the said drawings, 1 represents a hollow wrist-pin journaled in inwardly extending bearings 2 formed integral with the piston 3 and having the usual connecting rod 4 secured thereto. The bearings are preferably plain bearings of the same material as the piston, although if desired, they may be provided with any kind of bronze bushing. The oil which is thrown upon the walls of the cylinder 5 is swept or carried partially by the piston rings 6, 7 and 8, at the time of the downward stroke of the piston and accumulates in a recess 9 formed in each end of the wrist-pin. Each of the bearings is formed with a groove 10 and 11, which grooves start at the outer periphery of the piston and extend inwardly to a point near the end of the bearing. The oil which accumulates in the recesses 9 will be caused to flow into these grooves 10 and 11 and thereby furnish lubricant for the wrist-pin. Gases which leak from the piston chamber 12 past the piston rings, and which are partially stopped by a ring 13, can escape through the hollow wrist-pin 1 and openings 14 therein into the crank case. By this construction, it will be seen that the gases instead of forcing their way between the wrist-pin and its bearings, will find a ready escape through the hollow wrist-pin and openings therein so that the danger of carbon and soot being deposited in the bearings is eliminated; and, further, the danger of the pressure of the escaping gases throwing the oil out of the bearings is likewise obviated.

Having thus described my invention, I claim:—

1. In an internal combustion engine, a cylinder and piston, bearings on said piston, a hollow wrist-pin rotatably mounted in said bearings and communicating with the outside of said piston and also with the interior thereof to permit the escape of gases therethrough.

2. In an internal combustion engine, a cylinder and a hollow piston, inwardly-extending bearings on said piston, a wrist-pin rotatably mounted in said bearings, said wrist-pin having a gas passage-way which communicates with the exterior and interior of said piston.

3. In an internal combustion engine, a cylinder and a hollow piston, bearings on said piston, piston rings about said piston on either side of said bearings, and a wrist-pin rotatably mounted in said bearings, said wrist-pin having a communication with the exterior and interior of said piston to permit the escape of gases therethrough.

4. In an internal combustion engine, a cylinder and its hollow piston, bearings carried by said piston, a wrist-pin rotatably mounted in said bearings, the ends of said wrist-pin being formed with oil-receiving recesses, and oil passages in said bearings communicating with said recesses, said wrist-pin having a gas communication with the exterior and interior of said piston.

5. In an internal combustion engine, a cylinder and a hollow piston, bearings on said piston, a hollow wrist-pin rotatably mounted in said bearings, a piston rod fixedly connected with said wrist-pin, said bearings having oil passage-ways communicating with the interior of the walls of said cylinder and said hollow piston having a gas communication with the exterior and interior of said piston.

In testimony whereof, I have hereunto set my hand this 30th day of October, 1913.

CHARLES BALOUGH.

Witnesses:
 CHAS. I. WELCH,
 ESTHER E. PFEIFER.